(12) United States Patent
Doyle

(10) Patent No.: US 6,510,432 B1
(45) Date of Patent: Jan. 21, 2003

(54) METHODS, SYSTEMS AND COMPUTER PROGRAM PRODUCTS FOR ARCHIVING TOPICAL SEARCH RESULTS OF WEB SERVERS

(75) Inventor: Ronald Patrick Doyle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/534,558

(22) Filed: Mar. 24, 2000

(51) Int. Cl.[7] .............................................. G06F 17/30
(52) U.S. Cl. ..................................... 707/10; 707/103 R
(58) Field of Search .............................. 707/103 R, 10; 709/201, 225, 226, 231; 714/35, 1

(56) References Cited

U.S. PATENT DOCUMENTS

| | | | |
|---|---|---|---|
| 5,732,214 A | 3/1998 | Subrahmanyam | 709/227 |
| 5,751,997 A | 5/1998 | Kullick et al. | 711/162 |
| 5,761,673 A | 6/1998 | Bookman et al. | 709/311 |
| 5,764,972 A | 6/1998 | Crouse et al. | 707/1 |
| 5,903,889 A | 5/1999 | De la Huerga et al. | 707/3 |
| 5,918,214 A | 6/1999 | Perkowski | 705/27 |
| 5,931,901 A | 8/1999 | Wolfe et al. | 709/206 |
| 5,956,733 A | 9/1999 | Nakano et al. | 707/204 |
| 6,289,382 B1 * | 9/2001 | Bowman-Amuah | 707/206 |
| 6,345,288 B1 * | 2/2002 | Reed et al. | 709/201 |
| 6,434,568 B1 * | 8/2002 | Bowman-Amuah | 707/103 |

FOREIGN PATENT DOCUMENTS

WO    WO97/15890    5/1997    ......... G06F/17/30

OTHER PUBLICATIONS

Chang, S.–P., et al., *Internet Soft Parcel Delivery and/or Archiving System*, IBM Technical Disclosure Bulletin, vol. 40, No. 06, pp. 177–179 (Jun. 1997).

* cited by examiner

*Primary Examiner*—Diane D. Mizrahi
(74) *Attorney, Agent, or Firm*—Myers Bigel Sibley & Sajovec; Jeanine S. Ray-Yarletts

(57) ABSTRACT

Methods, systems and computer program products are provided for archiving information from a plurality of web servers by specifying at least one topic to be searched, searching the plurality of web servers so as to locate information associated with the at least one topic to be searched and retrieving the located information from at least one of the plurality of web servers. The retrieved information is archived so as to allow subsequent retrieval of the archived information independent of the plurality of web servers. This process is then periodically repeated so as to provide a history of information associated with the at least one topic. Systems are also provided including servlets for searching and archiving information on a user specified topic.

37 Claims, 4 Drawing Sheets

METHODS, SYSTEMS AND COMPUTER PROGRAM PRODUCTS FOR ARCHIVING TOPICAL SEARCH RESULTS OF WEB SERVERS

FIELD OF THE INVENTION

The present invention relates to information provided by web servers and more particularly to the archiving of such information.

BACKGROUND OF THE INVENTION

With the proliferation of content on the Internet or the World Wide Web it has become ever more difficult to keep track of content that relates to a particular topic. For example, content of existing web sites is typically changing on a regular basis. Furthermore, new content is generally being added on a regular basis. To be able to find such content may be time consuming. Furthermore, once new content is found, because of the transitory nature of the contents of web sites, this content may change and be lost.

One system which tracks changes in web pages is described in PCT publication WO 97/15890 entitled IDENTIFYING CHANGES IN ON-LINE DATA REPOSITORIES, the disclosure of which is incorporated herein by reference as if set forth fully herein. In this PCT publication, a system is described which tracks changes in web pages identified by a user's "hot list." While the system described in the PCT publication may provide for tracking specific web pages, it does not provide for locating web pages related to a topic. Thus, the web pages are specified in advance by a user. Thus, the system of the PCT publication does not take into account the fluid nature of the Internet in both content of web pages and the existence of web pages.

Accordingly, improvements are needed in monitoring content provided by web servers.

SUMMARY OF THE INVENTION

Embodiments of the present invention include methods, systems and computer program products which provide for archiving information from a plurality of web servers by specifying at least one topic to be searched, searching the plurality of web servers so as to locate information associated with the at least one topic to be searched and retrieving the located information from at least one of the plurality of web servers. The retrieved information is archived so as to allow subsequent retrieval of the archived information independent of the plurality of web servers. This process is then periodically repeated so as to provide a history of information associated with the at least one topic.

In further embodiments of the present invention, the plurality of web servers are searched and the located information retrieved by identifying information accessible through one of the plurality of web servers associated with the at least one topic and retrieving the identified information. The identified information is then analyzed to determine if additional information associated with the topic is specified by the identified information and this additional information associated with the topic is retrieved. The additional information specified by the identified information may be stored at the one of the plurality of web servers. In such a case, the additional information is retrieved from the one of the plurality of web servers. Alternatively, the additional information specified by the identified information may be stored at a different one of the plurality of web servers. In such a case, the additional information associated with the topic is retrieved from the different one of the plurality of web servers.

In still further embodiments of the present invention, the identified information is analyzed by detecting hyperlinks in the identified information, wherein the hyperlinks specify additional information associated with the topic.

In other embodiments of the present invention, the search and retrieval of information is provided by analyzing the retrieved information to determine if additional information related to the at least one topic may be retrieved. The additional information is then retrieved and archived. Preferably, the archived additional information is associated with the at least one topic.

In yet other embodiments of the present invention, the topic to be searched is specified by specifying a plurality of keywords and a relationship between the plurality of keywords. Alternatively, the topic to be searched may be specified by identifying a document associated with at least one topic. The identified document may then be analyzed so as to identify characteristics of the document associated with the at least one topic associated with the document. A search may then be developed based on the identified characteristics of the document so as to search for information associated with the at least one topic.

In other embodiments of the present invention, the archived information is stored at a location local to a user. Alternatively, the retrieved information may be stored at a web server.

In still further embodiments of the present invention, a system for generating an information archive is provided. The system includes a database and a search servlet configured so as to periodically search and retrieve information stored in a plurality of information sources associated with a user specified topic. An archive servlet is configured so as to store the information retrieved by the search servlet in the database and to associate the stored information with the user specified topic. Also, an archive user interface program is configured so as to access the database to retrieve information stored in the database and associated with the user specified topic independent of the information stored in the plurality of information sources.

In further embodiments, a search user interface program is configured so as to specify the topic for the search servlet to periodically search. The search user interface program and the archive user interface program may be configured to allow access to the search servlet and the archive servlet by a web browser.

In other embodiments, the search servlet is further configured to analyze the retrieved information and retrieve additional information identified in the retrieved information and wherein the archive servlet is further configured to stored the additional information.

While the invention has been described above primarily with respect to the method aspects of the invention, both systems and/or computer program products are also provided.

DETAILED DESCRIPTION OF PREFERRED EMBODIMENTS

Figure 1:
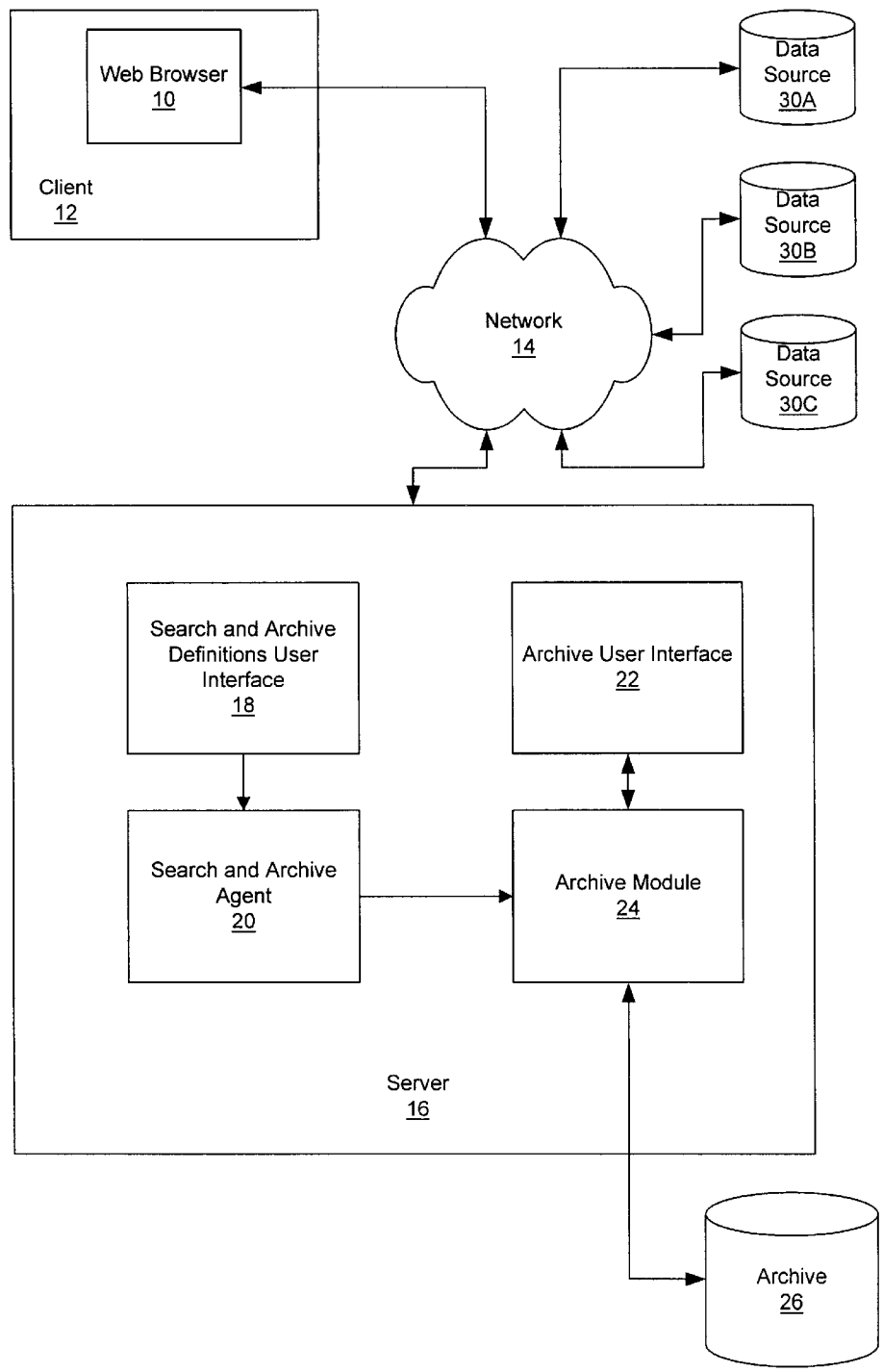
FIG. 1 is a block diagram of a system according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by those of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to an embodiment of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

As is described in more detail below, the present invention provides for gathering and archiving web content for future reference. Such gathering is provided by an automated process where searches of the web are periodically carried out to locate information on a user specified topic and that information retrieved and stored in a database so that the content is accessible independent of the status of the content on the web. The database may then be accessed by a user to retrieve the content.

Various embodiments of the present invention will now be described with reference to FIGS. 1 through 5. FIG. 1 illustrates a network environment in which embodiments of the present invention may be utilized. As will be appreciated by those of skill in the art, however, the operations of embodiments of the present invention may be carried out on a single processing system with access to a network such as an intranet or the Internet. As seen in FIG. 1, a client data processing system 12, such as a personal computer, laptop computer, pervasive computing device such as a personal data assistant (PDA), smartphone, or other mobile terminal, may utilize a web browser 10 or other application or program to communicate over network 14 to another data processing system which may act as a server 16. The network 14 may be an intranet or the Internet or other networks known to those of skill in the art.

As is further illustrated in FIG. 1, the server 16 preferably includes a search and archive definitions user interface 18 and a search and archive agent 20. The search and archive definitions user interface may communicate with the client 12 and, more particularly, with the web browser 10 so as to define a topic or topics for the search and archive agent 20 to search and retrieve information content. The search and archive agent 20 utilizes the topic information to search data sources over a network, such as the data sources 30A through 30C illustrated in FIG. 1, for information content related to the specified topic and retrieves this related content. The data sources may be located separate from the server 16 or may be located, at least in part, on the server 16 or on the client 12.

The search and archive agent 20 also communicates with an archive program such as the archive module 24 illustrated in FIG. 1. The archive module 24 receives retrieved content from the search and archive agent 20 and stores the content in a data repository such as the archive 26 illustrated in FIG. 1. The archive 26 may be a database or other data repository and may be located at the server 16 or may be remote from the server 16. Furthermore, the archive 26 may also be located at the client 12.

As is further illustrated in FIG. 1, an archive user interface 22 may also be provided so as to allow a user of client 12 to access the archive 26 through, for example, the archive module 24, and retrieve the archived information content. As will be appreciated by those of skill in the art, while a single search and archive definitions user interface 18, a single search and archive agent 20, a single archive servlet 24, as single archive user interface 22 and a single archive 26 are illustrated in FIG. 1, multiple instances of one or more of these components may be provided. Furthermore, the particular breakdown of operations between the various components may differ from embodiment to embodiment. Accordingly, the present invention should not be construed as limited to the particular division of functions illustrated in FIG. 1.

The search and archive agents 20 and the archive programs 24, as well as the interfaces for such agents and programs, according to various embodiments of the present invention, are preferably implemented in the Java programming language utilizing "JavaBeans" which is the name of a component architecture for use with the Java programming language. ("JavaBeans" and "Java" are trademarks of Sun Microsystems, Inc.) A JavaBean is the Java term for a "component," where a component is a reusable building block of application logic that a programmer can combine with other components to form an application program. "Enterprise JavaBeans" is a server component architecture which extends the JavaBeans architecture to the enterprise. "Enterprise" in this sense refers to an organization that uses computers in a networking environment, typically on a very large scale. Embodiments of the present invention may be JavaBeans or Enterprise JavaBeans or combinations of JavaBeans and Enterprise JavaBeans.

A Java programmer creates a Java application program by assembling components that provide the desired functionality for an application. A JavaBean may contain code for a relatively simple function such as displaying a button on a GUI, but it may also contain quite complex code. An Enterprise JavaBean, or "EJB," is similar to a JavaBean, with several exceptions.

JavaBeans may provide code for visual objects, such as the GUI button discussed above; EJBs generally are non-visual. The logic for a JavaBean is stored within the bean's "wrapper," where a "wrapper" is the Java term for functionality required to adapt a JavaBean or EJB to its container. A "container" is the Java terminology for an application context in which a bean (including an EJB) is executed. Thus, a JavaBean's logic is executed by invoking a method on the bean's wrapper, enabling the wrapper to detect when the bean has been modified (and thus needs to be updated in persistent storage). For EJBs, on the other hand, the executable logic is stored within the entity bean itself. Methods invoked by sending a message to an EJB's wrapper are forwarded to the bean for execution.

A Java development environment typically includes class libraries for use by developers when programming (i.e. developing applications) in the Java language. Class libraries are reusable sets of reusable classes which typically provide relatively high level functionality. A class is one of the basic building blocks of object-oriented languages such as Java, and comprises code which represents a combination of logic function and data. A developer creates an application by adding classes from a class library to the software application being created. A copy, or "instance," of a class is then included in the application. Using the Java terminology, one or more classes may be combined to form a JavaBean, and one or more JavaBeans may then be combined to form an application. For the enterprise environment, Enterprise JavaBeans may be used in order to provide access to remotely-stored objects. These concepts and techniques of Java programming are well known to those skilled in the art, and will not be discussed in depth herein.

In general, in particular embodiments of the present invention, the search and archive definitions user interface 18 and the archive user interface 22 may be applets developed utilizing JavaBeans so as to provide a GUI interface which accepts user input to define topics for the search and archive agent 20, which may be a servlet, to search over the network 14 and retrieve information related to the defined topics. Furthermore, the GUI interface may also provide the ability to search and retrieve content from the archive 26 utilizing the archive module 24 which may be a servlet. The search and archive agent 20 and the archive module 24 may be developed utilizing EJBs. Similarly, the Java Server Pages (JSP) could be utilized for various aspects of the present invention. Alternatively, all operations could be developed for execution by the client 12 and may be developed as applets utilizing conventional Java or non-Java programming techniques to provide cross-platform support.

Figure 2:
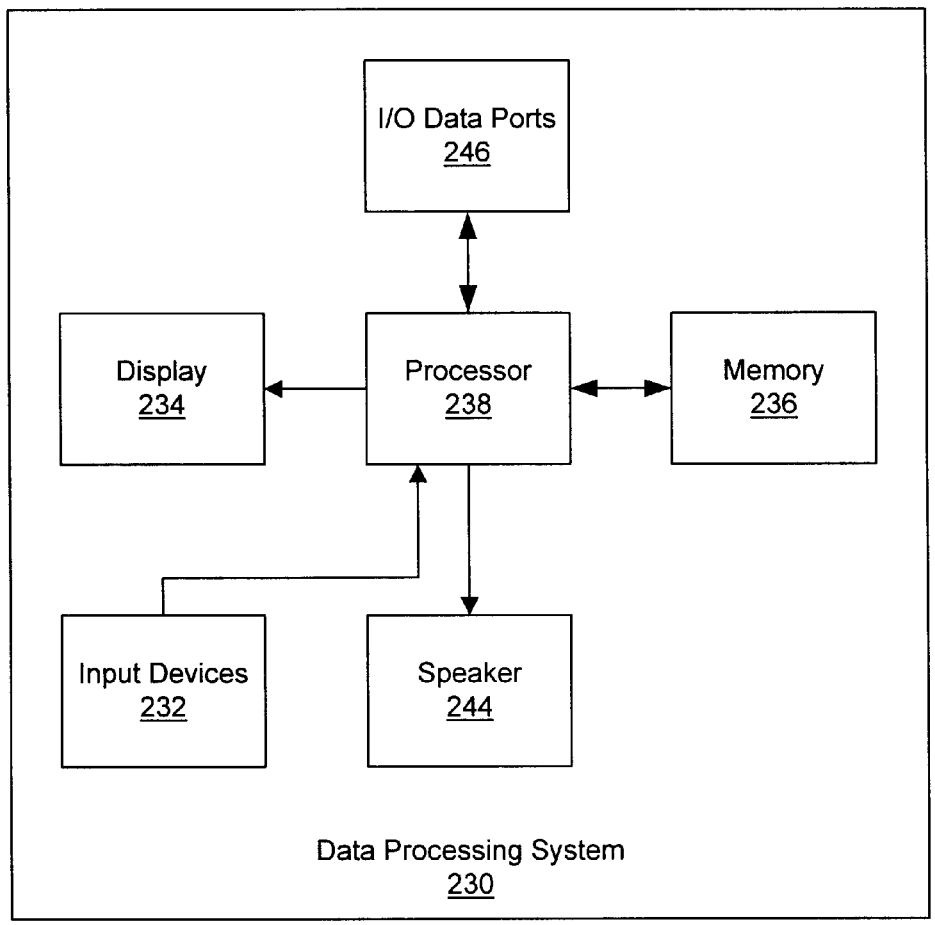
FIG. 2 is a block diagram of a data processing system according to embodiments of the present invention.

Referring now to FIG. 2, an exemplary embodiment of a data processing system 230 in accordance with embodiments of the present invention typically includes input device(s) 232 such as a keyboard or keypad, a display 234, and a memory 236 that communicate with a processor 238. The data processing system 230 may further include a speaker 244, and an I/O data port(s) 246 that also communicates with the processor 238. The I/O data port 246 can be used to transfer information between the data processing system 230 and another computer system or a network (e.g., the Internet). These components may be conventional components such as those used in many conventional data processing systems which may be configured to operate as described herein. Furthermore, as will be appreciated by those of skill in the art, the data processing system 230 may be configured as the client 10 or the server 16.

Figure 3:
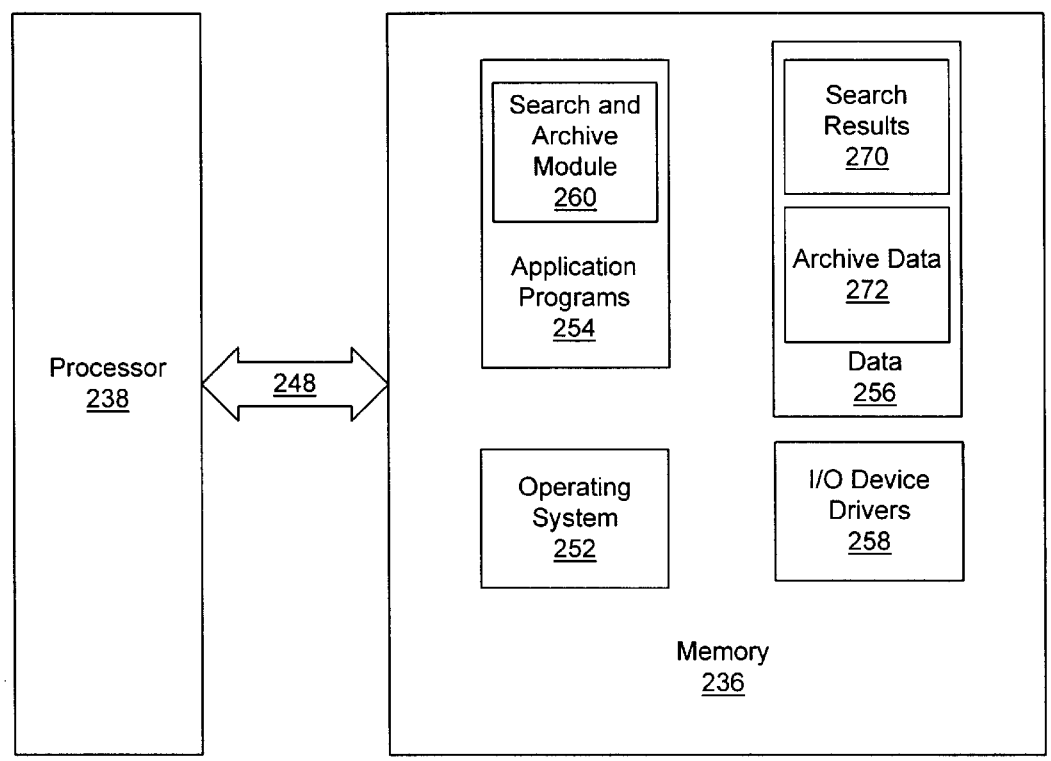
FIG. 3 is a more detailed block diagram of data processing systems according to embodiments of the present invention.

FIG. 3 is a block diagram of embodiments of data processing systems that illustrates systems, methods, and computer program products in accordance with the present invention. The processor 238 communicates with the memory 236 via an address/data bus 248. The processor 238 can be any commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 3, the memory 236 may include several categories of software and data used in the data processing system 230: the operating system 252; the application programs 254; the input/output (I/O) device drivers 258; and the data 256. As will be appreciated by those of skill in the art, the operating system 252 may be any operating system suitable for use with a data processing system, such as OS/2, AIX or System390 from International Business Machines Corporation, Armonk, N.Y., Windows95, Windows98 or Windows2000 from Microsoft Corporation, Redmond, Wash., Unix or Linux. The I/O device drivers 258 typically include software routines accessed through the operating system 252 by the application program 254 to communicate with devices such as the input devices 232, the display 234, the speaker 244, the I/O data port(s) 246, and certain memory 236 components. The application programs 254 are illustrative of the programs that implement the various features of the data processing system 230 and preferably include at least one application which provides the search and archive of network content aspects of embodiments of the present invention. Finally, the data 256 represents the static and dynamic data used by the application programs 254, the operating system 252, the I/O device drivers 258, and other software programs that may reside in the memory 236.

As is further seen in FIG. 3, the application programs 254 preferably include search and archive module 260. The search and archive module 260 preferably carries out operations as described herein for providing the topical search and archive of network content. Thus, the search and archive module 26 may provide operations of one or more of the search and archive definitions user interface 18, the search and archive agent 20, the archive user interface 22 and the archive module 22. Furthermore, the search and archive module 260 may be different depending on whether the system illustrated in FIG. 3 is the client 10 or the server 16. Alternatively, a search and archive module 260 may be utilized for both the client 10 and the server 16. Furthermore, the data portion of memory 236 preferably includes a search definition 270 which defines the topic(s) which are to be searched and archived. The data portion of memory 236 may also include archive data 272 which may include search results or data obtained from the archive 26.

While the present invention is illustrated, for example, with reference to a search and archive module 260, as will be appreciated by those of skill in the art, the search and archive module 260 may also be incorporated into the operating system 252. Thus, the present invention should not be construed as limited to the configuration of FIG. 3 but is intended to encompass any configuration capable of carrying out the operations described herein.

Figures 4, 5:
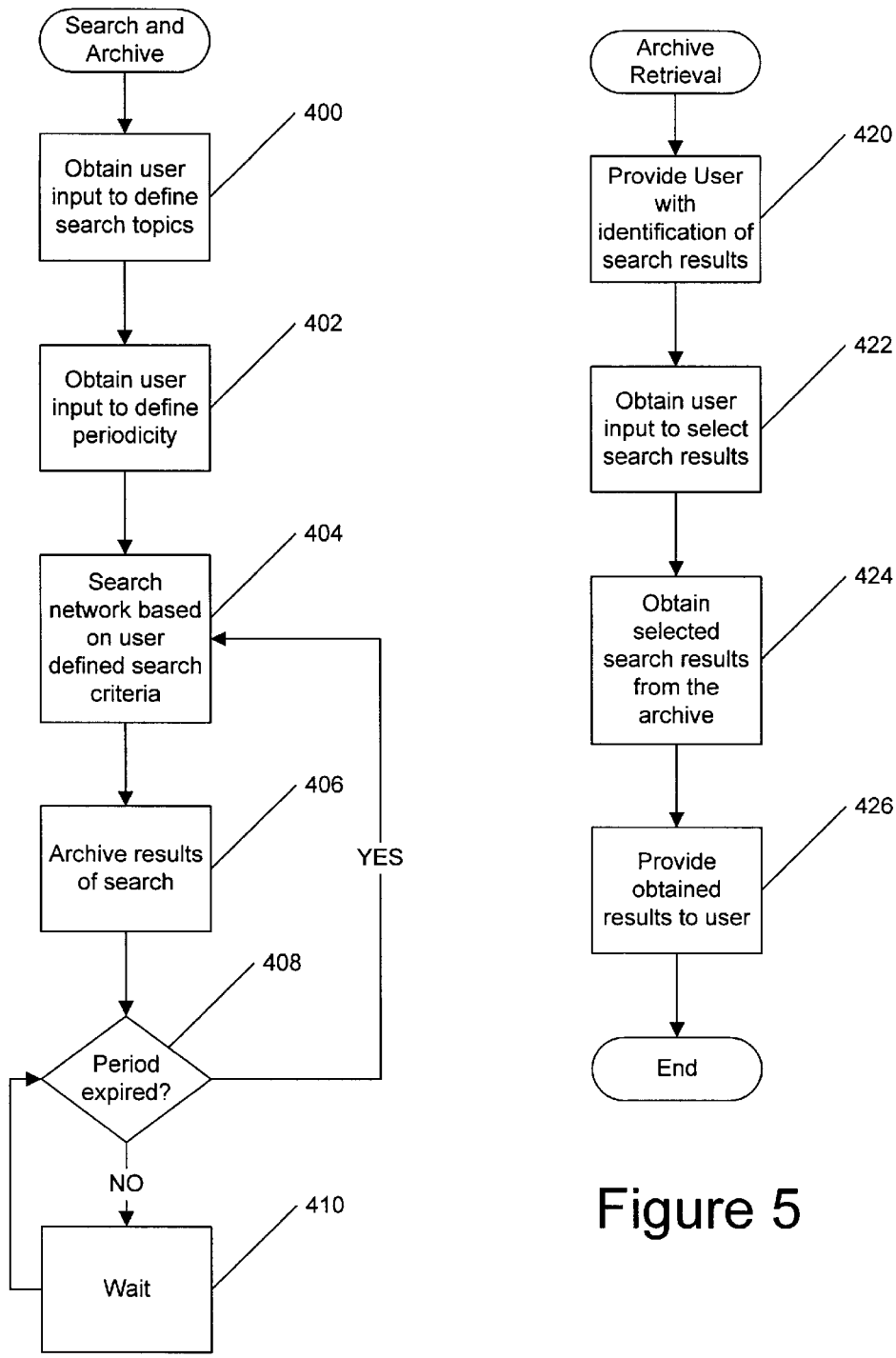
FIG. 4 is a flowchart illustrating operations of a search and retrieval agent according to embodiments of the present invention.
FIG. 5 is a flowchart illustrating operations of an archive agent according to embodiments of the present invention.

Embodiments of the present invention will now be described in more detail with reference to FIGS. 4 and 5 which are flowchart illustrations of operations carried out by a search and archive agent 20 and archive module 24. As seen in FIG. 4, the search and archive agent 20 may obtain user input from the search and archive definitions user interface 18 to define search topics (block 400) for the search and archive agent 20. The topic may be defined, for example, by specifying keywords for a search, by identifying an exemplary document on the topic or an exemplary web site on the topic and then analyzing the document or web site utilizing Latent Semantic Indexing (LSI) or Singular Value Decomposition (SVD)to, for example, identify key words based on the document or web page contents. Systems for LSI and SVD analysis of documents to identify topics in the documents are known to those of skill in the art and, therefore, will not be described in detail herein. Other methods of defining a topic for search and retrieval by the search and archive agent 20 may also be utilized.

In addition to defining a topic for search, a user defined periodicity may also be specified (block 402). The periodicity defines how often the search and archive agent 20 will search the data sources (such as data sources 30A through 30C) accessible through the network 14 for information content on the topic. This periodicity may depend on the topic being searched. For example, if the topic being searched is information on a stock, such as price and company announcements, the periodicity may be hourly. If, however, the topic is a current event, then the periodicity may be daily, weekly or even monthly.

Returning to FIG. 4, the search and archive agent 20 searches the network 14, such as the Internet or an intranet, for data sources, such as the data sources 30A through 30C, for information on the specified topic and retrieves the identified content on the specified topic (block 404). The search for information may take the form of utilizing a search engine which includes a database of keywords and other information identified in, for example, a web page. Furthermore, the search may take the form of retrieving a document, such as a web page, and then analyzing the document contents to determine if any additional information on the specified topic is identified in the document. Such analysis may include identity hyper-links in the retrieved document. This information may then be retrieved and it analyzed to determine if additional information is defined. This process of retrieval and analysis may be repeated until no additional information is identified or, alternatively, a user defined level of remoteness could be specified to limit how far from an original search result the process would go. Other criteria also may be used to terminate searching, such as obtaining a predefined number of results. As will be appreciated by those of skill in the art, a combination of searching using search engines and analysis of documents such as web pages may also be utilized so as to locate and retrieve information related to the user specified topic. In addition, the search and retrieval process could also locate and retrieve information on related topics which may be of interest to the user. Such a determination of related topics may also be made based on an analysis of the search results.

As is further illustrated in FIG. 4, at least some of the retrieved information may be archived in the archive 26 by, for example, the archive module 24 (block 406). The archive process may be carried out by, for example, utilizing Java Data Base Control (JDBC) commands to store the information in a database. Preferably, the information is stored in the database in a manner which allows it to be retrieved based on topic and/or time of when the data was retrieved. Furthermore, it is preferred that the retrieved information be archived in a manner that allows a user to determine the information which they specified be archived. Thus, the information may be archived in a database which includes an identification of the user requesting the search and archive, the criteria which defines the topic, a timestamp of when the results were obtained and the web pages or other information content which were the results of the search process. The criteria may be stored as a variable size table which includes, for example, each keyword entered by a user or extracted from an example document or web site.

Additionally, the information stored in the database may be the exact results of the search, such as Hyper-text Markup Language (HTML) or Extensible Markup Language (XML) documents or web pages, video or audio clips or the like, or the results may be further processed by the archive module 24 to facilitate subsequent use of the results. For example, excerpts of the results could be stored or the results could be modified by, for example, removing graphics or other data and/or communications intensive portions of the results. Similarly, a relevance ranking could be provided with the results to facilitate subsequent analysis of the results. Also, an association with other results could also be provided.

After archiving the search results, the search and archive agent 20, then waits for the time period, specified by the periodicity described above, to expire (blocks 408 and 410). After the time period expires (block 408), the search and archive agent 20 then repeats the search to obtain a new set of search results and archives these search results (blocks 404 and 406). As will be appreciated by those of skill in the art, because the content which is searched may have changed, the results of the search may differ from those previously obtained. Thus, for example, in a first search the data sources 30A and 30B may have information on the specified topic. However, when the search is conducted at a later time, the data sources 30B and 30C may be the only data sources with information on the content. Thus, the information contained in data sources 30A and 30B would be archived as a result of the first search and the contents of data sources 30B and 30C would be archived as a result of the subsequent search.

As will be appreciated by those of skill in the art in light of the present disclosure, the results of the search may also be compared with prior results so as to eliminate duplication. Thus, for example, if a subsequent search retrieved the same web page, then the entry in the database could point to the previously retrieved web page and indicate that it was also included in the results of a subsequent search. For example, the retrieved web pages could be stored in a separate table of a database and a relational pointer included in a search results table entry in the database which points to entry in the table of web pages. However, in light of the increase in storage capacities of current storage devices, a complex duplicate detection system may be less advantageous.

FIG. 5 illustrates operations for retrieval of archived information. As is seen in FIG. 5, a user may be provided with an identification of search results (block 420) and user input obtained to select the results (block 422). The identification of search results may be an indication of the results of the search or merely an indication that search results exist. Furthermore, the selection of search results may be, for example, provided by selecting results from a list or may be achieved by a search of the archive database. Such a selection may be made utilizing, for example, a CGI web page to display the results and obtain user input. In the event that a search of the archive is provided, searches may be formulated utilizing any system for searching databases known to those of skill in the art.

However the search results are selected by the user, the selected search results are obtained from the archive (block 424). These obtained search results are then provided to the user (block 426). The search results may be provided to the user by, for example, providing a results web page to a web browser of the user. Furthermore, the archive may be made available to users other than the user which defined the topic. Alternatively, the results could be limited to the user which specified the topic. In such a case, the user identification field of the database could be compared with a user identification provided by the user to determine if a match existed. Furthermore, the archives could be encrypted or password protected to further enhance security.

As is illustrated by the operations of FIGS. 4 and 5, it is preferred that the search and archive agent 20 operate autonomously once the user has defined a topic for search so that the user need not be "connected" to the search and archive agent 20. Such autonomy may be provided by an agent executing on a different data processing system or may be provided by the agent being a "background" process on the same data processing system as the user. Similarly, the archive module 24 may also be autonomous such that requested results may be prepared while the user is disconnected from the network and then provided, for example, as a results web page, when the user reconnects to the network.

Embodiments of the present invention where the agent executes on a separate data processing system from the user may be particularly useful in a mobile computing environment or in a high communication cost environment where users are only intermittently connected to a network. In such a case, the agents may perform the search and archive operations while the user's data processing system is disconnected from the network. The user may then retrieve the archived results during a subsequent connection to the network.

For example, a user may connect to the network 14 and specify that the search and archive agent 20 obtain and archive information relating to a new product under development. The search and archive agent 20 could then periodically search a corporate intranet for information on the new product as well as search the Internet for information on related products of competitors. The results of these periodic searches would be archived in the archive 26 so that when the user again connects to the network 14 and requests the search results from the archive module 24, the results of the periodic searches could be provided to the user. Thus, the user need not perform their own searches to stay up to date on the product development and competitors. Furthermore, the history of the product development would be available to the user for future reference. Additionally, other users could access the archive to obtain information on the product or, alternatively, initiate their own search and archive agents.

The flowcharts and block diagrams of FIGS. 1 through 5 illustrate the architecture, functionality, and operation of a possible implementation for archiving web content according to the present invention. In this regard, each block in the flowcharts represents a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may in fact be executed substantially concurrently or the blocks may sometimes be executed in the reverse order, depending upon the functionality involved. Thus, while the present invention is described as searching the network and then archiving the results, these operations could be carried out concurrently where results are archived while the search is being performed. Similarly, the results of the search could be provided to the user without providing an identification of the results and receiving user input to select the results. Accordingly, the present invention should not be construed as limited to discrete operations but should be construed as teaching the results of the operations irrespective of the division of actions which produced such results.

While the present invention has been described with reference to a client-server architecture, as will be appreciated by those of skill in the art, the present invention may be provided as a stand-alone application.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of archiving information from a plurality of web servers, comprising:

specifying at least one topic to be searched;

searching the plurality of web servers so as to locate information associated with the at least one topic to be searched;

retrieving the located information from at least one of the plurality of web servers;

archiving the retrieved information so as to allow subsequent retrieval of the archived information independent of the plurality of web servers; and automatically periodically repeating the steps of searching, retrieving and archiving so as to provide a history of information associated with the at least one topic.

2. A method according to claim 1, wherein the steps of searching the plurality of web servers and retrieving the located information comprise the steps of:

identifying information accessible through one of the plurality of web servers associated with the at least one topic;

retrieving the identified information;

automatically analyzing the identified information to determine if additional information associated with the topic is specified by the identified information; and retrieving the additional information associated with the topic.

3. A method according to claim 2, wherein the additional information specified by the identified information is stored at the one of the plurality of web servers and wherein the step of retrieving the additional information comprises the step of retrieving the additional information associated with the at least one topic from the one of the plurality of web servers.

4. A method according to claim 2, wherein the additional information specified by the identified information is stored at a different one of the plurality of web servers and wherein the step of retrieving the additional information comprises the step of retrieving the additional information associated with the topic from the different one of the plurality of web servers.

5. A method according to claim 2, wherein the step of analyzing the identified information comprises the step of detecting hyperlinks in the identified information, wherein the hyperlinks specify additional information associated with the topic.

6. A method according to claim 1, wherein the steps of searching and retrieving further comprise the steps of:

automatically analyzing the retrieved information to determine if additional information related to the at least one topic may be retrieved;

identifying the additional information related to the at least one topic;

retrieving the identified additional information; and archiving the retrieved additional information.

7. A method according to claim 6, wherein the archived additional information is associated with the at least one topic.

8. A method according to claim 1, wherein the step of specifying at least one topic to be searched comprises the step of specifying a plurality of keywords and a relationship between the plurality of keywords.

9. A method according to claim 1, wherein the step of specifying at least one topic to be searched comprises the steps of:

identifying a document associated with at least one topic;

automatically analyzing the identified document so as to identify characteristics of the document associated with the at least one topic associated with the document; and developing a search based on the identified characteristics of the document so as to search for information associated with the at least one topic.

10. A method according to claim 1, wherein the step of archiving stores the retrieved information at a location local to a user.

11. A method according to claim 1, wherein the step of archiving stores the retrieved information at a non-local server.

12. A system for generating an information archive, comprising:

a database;

a search servlet configured so as to automatically periodically search and retrieve information stored in a plurality of information sources associated with a user specified topic;

an archive servlet configured so as to store the information retrieved by the search servlet in the database and to associate the stored information with the user specified topic and when the search servlet retrieved the information; and an archive user interface program configured so as to access the database to retrieve information stored in the database and associated with the user specified topic independent of the information stored in the plurality of information sources.

13. A system according to claim 12, further comprising a search user interface program configured so as to specify the topic for the search servlet to periodically search.

14. A system according to claim 13, wherein the search user interface program and the archive user interface program are configured to allow access to the search servlet and the archive servlet by a web browser.

15. A system according to claim 12, wherein the search servlet is further configured to analyze the retrieved information and retrieve additional information identified in the retrieved information and wherein the archive servlet is further configured to stored the additional information.

16. A system for archiving information from a plurality of web servers, comprising:

means for specifying at least one topic to be searched;

means for searching the plurality of web servers so as to locate information associated with the at least one topic to be searched;

means for retrieving the located information from at least one of the plurality of web servers;

means for archiving the retrieved information so as to allow subsequent retrieval of the archived information independent of the plurality of web servers; and means for automatically periodically invoking the means for searching, means for retrieving and means for archiving so as to provide a history of information associated with the at least one topic.

17. A system according to claim 16, wherein the means for searching the plurality of web servers and the means for retrieving the located information comprise:

means for identifying information accessible through one of the plurality of web servers associated with the at least one topic;

means for retrieving the identified information;

means for automatically analyzing the identified information to determine if additional information associated with the topic is specified by the identified information; and means for retrieving the additional information associated with the topic.

18. A system according to claim 17, wherein the additional information specified by the identified information is stored at the one of the plurality of web servers and wherein the means for retrieving the additional information comprises means for retrieving the additional information associated with the at least one topic from the one of the plurality of web servers.

19. A system according to claim 17, wherein the additional information specified by the identified information is stored at a different one of the plurality of web servers and wherein the means for retrieving the additional information comprises means for retrieving the additional information associated with the topic from the different one of the plurality of web servers.

20. A system according to claim 17, wherein the means for analyzing the identified information comprises means for detecting hyperlinks in the identified information, wherein the hyperlinks specify additional information associated with the topic.

21. A system according to claim 16, wherein the means for searching and the means for retrieving further comprise:
means for automatically analyzing the retrieved information to determine if additional information related to the at least one topic may be retrieved;
means for identifying the additional information related to the at least one topic;
means for retrieving the identified additional information; and
means for archiving the retrieved additional information.

22. A system according to claim 21, wherein the archived additional information is associated with the at least one topic.

23. A system according to claim 16, wherein the means for specifying at least one topic to be searched comprises means for specifying a plurality of keywords and a relationship between the plurality of keywords.

24. A system according to claim 16, wherein the means for specifying at least one topic to be searched comprises:
means for identifying a document associated with at least one topic;
means for automatically analyzing the identified document so as to identify characteristics of the document associated with the at least one topic associated with the document; and
means for developing a search based on the identified characteristics of the document so as to search for information associated with the at least one topic.

25. A system according to claim 16, wherein the means for archiving stores the retrieved information at a location local to a user.

26. A system according to claim 16, wherein the means for archiving stores the retrieved information at a web server.

27. A computer program product for archiving information from a plurality of web servers, comprising:
a computer-readable storage medium having computer-readable program code embodied in said medium, said computer-readable program code comprising:
computer-readable program code which specifies at least one topic to be searched;
computer-readable program code which searches the plurality of web servers so as to locate information associated with the at least one topic to be searched;
computer-readable program code which retrieves the located information from at least one of the plurality of web servers;
computer-readable program code which archives the retrieved information so as to allow subsequent retrieval of the archived information independent of the plurality of web servers; and
computer-readable program code which automatically periodically invokes the computer-readable program code which searches, computer-readable program code which retrieves and computer-readable program code which archives so as to provide a history of information associated with the at least one topic.

28. A computer program product according to claim 27, wherein the computer-readable program code which searches the plurality of web servers and the computer-readable program code which retrieves the located information comprise:
computer-readable program code which identifies information accessible through one of the plurality of web servers associated with the at least one topic;
computer-readable program code which retrieves the identified information;
computer-readable program code which automatically analyzes the identified information to determine if additional information associated with the topic is specified by the identified information; and
computer-readable program code which retrieves the additional information associated with the topic.

29. A computer program product according to claim 28, wherein the additional information specified by the identified information is stored at the one of the plurality of web servers and wherein the computer-readable program code which retrieves the additional information comprises computer-readable program code which retrieves the additional information associated with the at least one topic from the one of the plurality of web servers.

30. A computer program product according to claim 28, wherein the additional information specified by the identified information is stored at a different one of the plurality of web servers and wherein the computer-readable program code which retrieves the additional information comprises computer-readable program code which retrieves the additional information associated with the topic from the different one of the plurality of web servers.

31. A computer program product according to claim 28, wherein the computer-readable program code which analyzes the identified information comprises computer-readable program code which detects hyperlinks in the identified information, wherein the hyperlinks specify additional information associated with the topic.

32. A computer program product according to claim 27, wherein the computer-readable program code which searches and the computer-readable program code which retrieves further comprise:
computer-readable program code which automatically analyzes the retrieved information to determine if additional information related to the at least one topic may be retrieved;
computer-readable program code which identifies the additional information related to the at least one topic;
computer-readable program code which retrieves the identified additional information; and
computer-readable program code which archives the retrieved additional information.

33. A computer program product according to claim 32, wherein the archived additional information is associated with the at least one topic.

34. A computer program product according to claim 27, wherein the computer-readable program code which specifies at least one topic to be searched comprises computer-readable program code which specifies a plurality of keywords and a relationship between the plurality of keywords.

35. A computer program product according to claim 27, wherein the computer-readable program code which specifies at least one topic to be searched comprises:
computer-readable program code which identifies a document associated with at least one topic;
computer-readable program code which automatically analyzes the identified document so as to identify characteristics of the document associated with the at least one topic associated with the document; and computer-readable program code which develops a search based on the identified characteristics of the document so as to search for information associated with the at least one topic.

36. A computer program product according to claim 27, wherein the computer-readable program code which archives stores the retrieved information at a location local to a user.

37. A computer program product according to claim 27, wherein the computer-readable program code which archives stores the retrieved information at a web server.

* * * * *